(12) United States Patent
Netes

(10) Patent No.: US 10,983,842 B2
(45) Date of Patent: Apr. 20, 2021

(54) DIGITAL SIGNAL PROCESSING PLUG-IN IMPLEMENTATION

(71) Applicant: Microsoft Technology Licensing, LLC, Redmond, WA (US)

(72) Inventor: Nir Netes, Oslo (NO)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/505,067

(22) Filed: Jul. 8, 2019

(65) Prior Publication Data

US 2021/0011784 A1 Jan. 14, 2021

(51) Int. Cl.
| G06F 9/54 | (2006.01) |
| G10H 1/00 | (2006.01) |
| G06F 9/52 | (2006.01) |

(52) U.S. Cl.
CPC .............. *G06F 9/541* (2013.01); *G06F 9/524* (2013.01); *G10H 1/0066* (2013.01)

(58) Field of Classification Search
None
See application file for complete search history.

(56) References Cited

U.S. PATENT DOCUMENTS

| 5,577,250 A * | 11/1996 | Anderson |
| 6,996,832 B2 | 2/2006 | Gunduc et al. |
| 7,162,426 B1 | 1/2007 | Schultz |
| 7,441,020 B2 | 10/2008 | Dideriksen et al. |
| 8,489,860 B1 * | 7/2013 | McMahon |
| 2001/0037408 A * | 1/2001 | Thrift |
| 2002/0065568 A1 | 5/2002 | Silfvast et al. |
| 2006/0122814 A1 | 6/2006 | Beens et al. |
| 2008/0229918 A1 | 9/2008 | Kulkarni et al. |

FOREIGN PATENT DOCUMENTS

| CN | 204143202 U | 2/2015 |
| EP | 1591884 A2 | 11/2005 |
| WO | 03073725 A2 | 9/2003 |
| WO | 2010054235 A2 | 5/2010 |

OTHER PUBLICATIONS

"JUCE 5.1: New DSP features", Retrieved from: https://juce.com/discover/stories/juce-5-1, Jul. 27, 2017, 9 pages.
"International Search Report and Written Opinion Issued in PCT Application No. PCT/US2020/032549", dated Aug. 14, 2020, 11 Pages.

* cited by examiner

*Primary Examiner* — Syed A Roni
(74) *Attorney, Agent, or Firm* — Mannava & Kang, P.C.

(57) ABSTRACT

In some examples, digital signal processing plug-in implementation may include obtaining attributes of a user interface for a digital signal processing plug-in, and obtaining attributes of digital signal processing logic for the digital signal processing plug-in. The digital signal processing plug-in implementation may include generating, based on the attributes of the user interface and the attributes of the digital signal processing logic, a plug-in process to control operation of the user interface and the digital signal processing logic. Further, the digital signal processing plug-in implementation may include establishing, based on the generated plug-in process, a two-way communication link between a host and the plug-in process to implement the digital signal processing plug-in.

19 Claims, 8 Drawing Sheets

DIGITAL SIGNAL PROCESSING PLUG-IN IMPLEMENTATION

BACKGROUND

A digital signal processing plug-in may represent computer software that may be used to modify an audio file, and/or generate and synthesize audio. For example, the digital signal processing plug-in may include a user interface that may be used to specify parameters that may be used to modify the audio file. Due to performance specifications and other such factors, digital signal processing plug-ins may be developed using specific computer languages. Moreover, computer code used to implement a digital signal processing plug-in may be specific to a platform type, such as macOS™, Windows™, Android™, etc. In this regard, it is technically challenging to utilize and develop a digital signal processing plug-in that is developed using a specific computer language and for a particular platform with different types of platforms.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
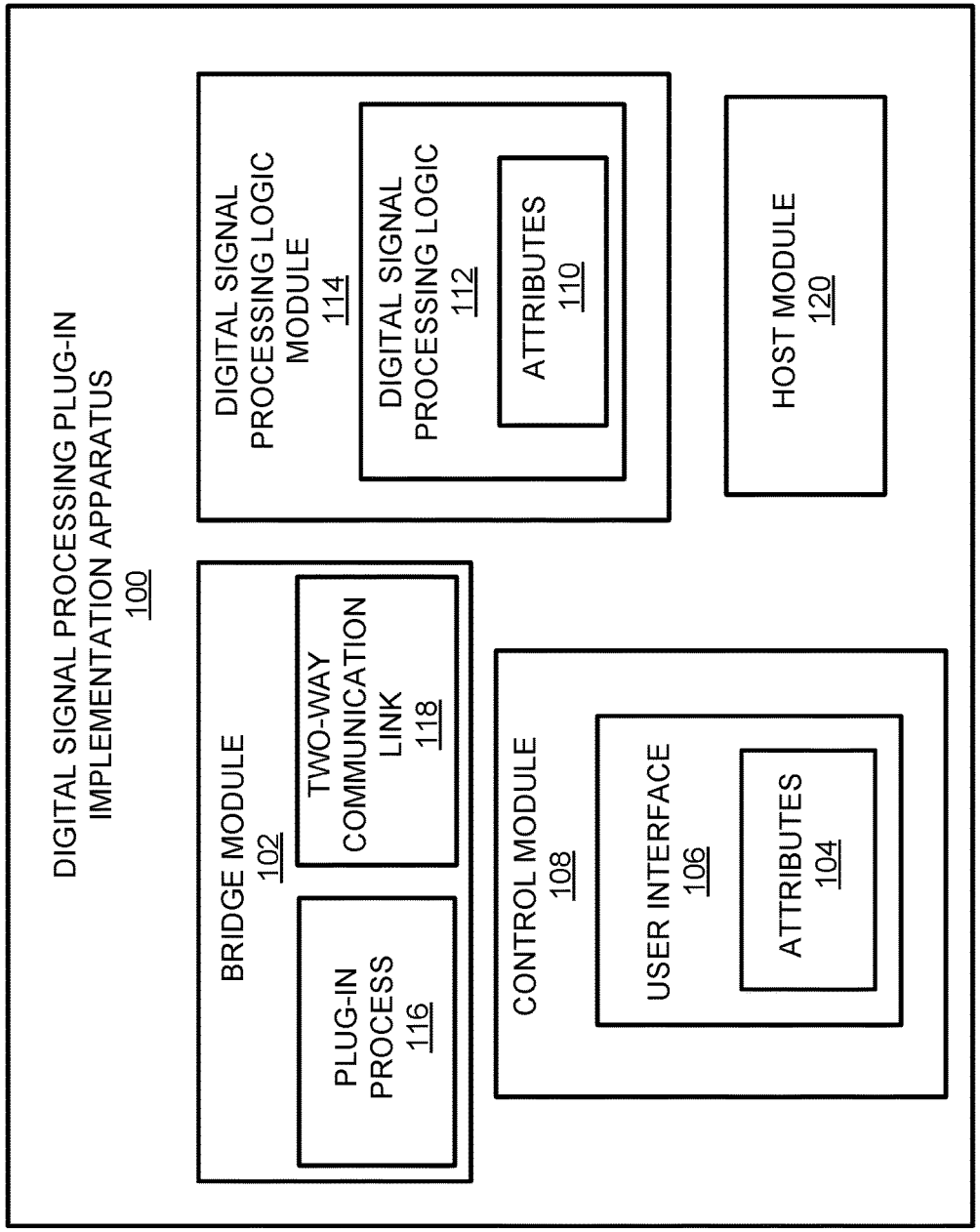
FIG. 1 illustrates a layout of a digital signal processing plug-in implementation apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Digital signal processing plug-in implementation apparatuses, methods for digital signal processing plug-in implementation, and non-transitory computer readable media having stored thereon machine readable instructions to provide digital signal processing plug-in implementation are disclosed herein. The apparatuses, methods, and non-transitory computer readable media disclosed herein may provide for implementation of a modular digital signal processing plug-in framework that includes a host module, a control module, a digital signal processing logic module, and a bridge module.

As disclosed herein, due to performance specifications and other such factors, digital signal processing plug-ins may be developed using computer languages such as C, C++, etc. Moreover, computer code used to implement a digital signal processing plug-in may be specific to a platform type, such as macOS™, Windows™, Android™, etc. In this regard, it is technically challenging to utilize a digital signal processing plug-in that is developed using a specific computer language and for a particular platform with different types of platforms.

In order to address at least the aforementioned technical challenges, the apparatuses, methods, and non-transitory computer readable media disclosed herein may provide for the implementation of a digital signal processing plug-in framework that includes a host module, a control module, a digital signal processing logic module, and a bridge module to operate as a proxy between the host module, the control module, and the digital signal processing logic module. The bridge module may be platform dependent, whereas the host module, the control module, and the digital signal processing logic module may be platform independent. Thus, the same host module, control module, and digital signal processing logic module may be used with a variety of platforms.

According to examples disclosed herein, the bridge module may represent a thin layer which the host module interacts with. The host module may be tasked with loading the bridge module as disclosed herein. The digital signal processing logic module may be tasked with handling of audio-related digital signal processing logic, examples of which include logic for generating or synthesizing audio, or augmenting an existing audio stream. The control module may provide for the modification of parameters for the digital signal processing plug-in, which may be implemented by the host module, the control module, the digital signal processing logic module, and the bridge module. Further, the control module may provide a user interface for an end-user, where the end-user may utilize the user interface to control the digital signal processing logic module in real time. Examples of controlling the digital signal processing logic module may include controlling a "volume level" parameter, controlling "stereo image" parameters of generated and/or synthesized audio, etc. According to another example, with respect to filtering, examples of parameters may include "filter type", "filter threshold", etc.

The bridge module may efficiently relay data in memory to different processes as disclosed herein. This functionality may provide for the usage of any programming language to write the actual digital signal processing logic and user interface experiences, which may thereafter be ported in a cross-platform manner. For example, the bridge module may be loaded by the host module. From the perspective of the host module, the bridge module may operate as a plug-in. In this regard, the host module may be unaware of the abstractions provided by the bridge module (such as the digital signal processing logic module, and the control module).

The bridge module may be built for a specific host module to facilitate communication of the host module with the bridge module. In this regard, the bridge module may be built, for example, by using a host-specific software development kit (SDK) to export a host-specific set of application programming interfaces (APIs).

With respect to operation of the apparatuses, methods, and non-transitory computer readable media disclosed herein, the host module may start by loading the bridge module, for example, as a dynamically linked library (DLL), for example, in Windows™ or a shared object library in Linux™ or Mac™ from a file system, using operating system loader APIs. For example, in Windows™, the host module may use the LoadLibrary API.

The host module may then initialize the bridge module. As part of this initialization procedure, the host module may pass "configuration metadata" to the bridge module's initialization routine. The exact set of metadata may be implementation specific (e.g., depending on the specific host module and platform), but may include parameters such as "plugin name", "channel count", "bitrate" among others.

The bridge module's initialization routine may be implemented as follows.

First, the bridge module may accept configuration parameters from the host module.

Next, the bridge module may establish an inter-process communication (IPC) mechanism which may be later used by the digital signal processing logic module and control module. An example of the IPC mechanism may include a named memory mapped file. The bridge module may start by calling, for example, CreateFileMapping and MapViewOfFile APIs on Windows™ (or similar APIs on other operating systems).

A named memory-mapped file may represent an IPC mechanism that allows processes that may be executed in isolation, to communicate and exchange data with each other. In the case of memory-mapped files, an operating system may offer two (or more) processes to share memory in between each other.

Next, the bridge module may initialize a shared lock-free producer-consumer queue on top of the memory mapped file. The exact layout of the shared lock-free producer-consumer queue may be implementation specific, but the initialization may include creating the shared lock-free producer-consumer queue and its internal structures in-memory.

A lock free producer-consumer queue may represent the data structure/algorithm that is used on-top of the memory-mapped file to facilitate the communication. The lock free producer-consumer queue may establish a protocol for the different processes involved to communicate with one another efficiently. The lock free producer-consumer queue may support "ReadMessage" and "WriteMessage" APIs which may be utilized by the host module, the bridge module, the digital signal processing logic module, and the control module.

Next, the bridge module may resolve which specific digital signal processing logic module and/or control module are to be used. The bridge module may do so, for example, by relying on the configuration parameters passed to it from the host module, in which case the bridge module may need to resolve a "plugin name" into a set of "digital signal processing logic module and control module". In this regard, the bridge module may consult a mapping of this data, for example, by parsing a file on the file system, or by reading from a registry (e.g., the Windows™ registry). In some cases, the mapping may be embedded directly into the bridge module (e.g., by hardcoding).

Once the digital signal processing logic module and the control module resolution has been completed, the bridge module may load the digital signal processing logic module and the control module. This loading may include the creation of a separate process for the digital signal processing logic module and the control module modules (e.g., by using a CreateProcess API in Windows™).

Since the digital signal processing logic module and the control module now exist in a separate process, this feature may decouple any technology and/or programming language needed to build these modules from any technologies and/or programming languages used by the bridge module and the host module. In other words, the digital signal processing logic module and the control module may be written in any desired programming language and/or technology.

Once the digital signal processing logic module and the control module are loaded, the bridge module's initialization routine may be considered completed, and control may be relinquished back to the host module (as well as the digital signal processing logic module and the control module). From this point on, the bridge module may serve as a relaying mechanism for data to pass back-and-forth between the host module and the digital signal processing logic module and the control module.

Once the bridge module has been fully loaded, the host module may communicate with the bridge module in the following manner.

Asynchronously, the host module may send a MIDI message to the bridge module. In this regard, the host module may call a function exported by the bridge module. The bridge module may take the MIDI message and forward the MIDI message using the shared lock-free producer-consumer queue to the digital signal processing logic module and the control module.

According to another example, the host module may routinely call the bridge module to determine whether audio data has been made available to the bridge module (e.g., by "polling" the bridge module in a loop). For example, the host module may call a function exported by the bridge module. The bridge module may determine whether audio data is available in the shared lock-free producer-consumer queue, read the audio data, and return the audio data back to the host module.

According to examples disclosed herein, the apparatuses, methods, and non-transitory computer readable media disclosed herein provide for control of the digital signal processing plugin remotely over a network, or through a mobile device.

According to examples disclosed herein, the bridge module for the apparatuses, methods, and non-transitory computer readable media disclosed herein may pass data between the digital signal processing logic module, the control module, and the host module over in-memory inter-process communication. In this regard, the bridge module may establish an IPC communications channel, and utilize this channel to pass data (e.g., messages) across different components of the apparatuses as disclosed herein. According to an example, the IPC communication channel may be implemented by using a memory-mapped file (e.g., APIs) as disclosed herein. The memory-mapped file may provide for the seamless sharing of memory across different components of the apparatuses as disclosed herein, where such components may otherwise operate in an independent (e.g., isolated) manner.

According to examples disclosed herein, the bridge module for the apparatuses, methods, and non-transitory computer readable media disclosed herein may pass data between the digital signal processing logic module, the control module, and the host module over a network.

According to examples disclosed herein, certain functionality of the digital signal processing logic module and the control module may be implemented in a browser, or as part of a web-browser based system. Based on the implementation of the digital signal processing logic module and the control module in a browser, or as part of a web-browser based system, these modules may be operated, for example, via a mobile device, such as a mobile phone, a tablet, etc. Yet further, based on the implementation of the digital signal processing logic module and the control module in a browser, or as part of a web-browser based system, these modules may be operated by one or simultaneously by a plurality of users.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example digital signal processing plug-in implementation apparatus (hereinafter also referred to as "apparatus 100").

Referring to FIG. 1, the apparatus 100 may include a bridge module 102 (hereinafter also referred to as "bridge") to obtain attributes 104 of a user interface 106 for a digital signal processing plug-in. In this regard, the digital signal processing plug-in may be implemented by the apparatus 100. Further, the user interface 106 may be implemented by a control module 108 (hereinafter also referred to as "controller"). Examples of attributes 104 may include a programming language that is used to implement the user interface 106, a platform that the user interface 106 is implemented for, etc.

The bridge module 102 may obtain attributes 110 of digital signal processing logic 112 for the digital signal processing plug-in. The digital signal processing logic 112 may be implemented by a digital signal processing logic module 114. Examples of attributes 110 may include a programming language that is used to implement the digital signal processing logic 112, a platform that the digital signal processing logic 112 is implemented for, etc.

The bridge module 102 may generate, based on the attributes 104 of the user interface 106 and the attributes 110 of the digital signal processing logic 112, a plug-in process 116 to control operation of the user interface 106 and the digital signal processing logic 112.

The bridge module 102 may establish, based on the generated plug-in process 116, a two-way communication link 118 between a host module 120 (hereinafter also referred to as "host") and the plug-in process 116 to implement the digital signal processing plug-in.

According to examples disclosed herein, the bridge module 102 may establish, based on the generated plug-in process and via IPC APIs, the two-way communication link 118 between the host module 120 and the plug-in process 116 to implement the digital signal processing plug-in.

According to examples disclosed herein, the bridge module 102 may generate, for the IPC APIs, a memory-mapped file. Further, the bridge module 102 may utilize the memory-mapped file and a lock-free producer-consumer queue to establish the two-way communication link 118.

According to examples disclosed herein, the bridge module 102 may forward musical instrument digital interface (MIDI) data to the lock-free producer-consumer queue.

According to examples disclosed herein, the bridge module 102 may receive audio data from the lock-free producer-consumer queue.

According to examples disclosed herein, the bridge module 102 may obtain, from the host module 120, MIDI data to be processed by the plug-in process 116. The bridge module 102 may forward, via the two-way communication link 118, the MIDI data to the plug-in process 116.

According to examples disclosed herein, the bridge module 102 may obtain, from the plug-in process 116, audio data. Further, the bridge module 102 may forward, via the two-way communication link 118, the audio data to the host module 120.

Operation of the apparatus 100 is described in further detail with reference to FIGS. 1-5.

As disclosed herein, the bridge module 102 may generate, based on the attributes 104 of the user interface 106 and the attributes 110 of the digital signal processing logic 112, a plug-in process 116 to control operation of the user interface 106 and the digital signal processing logic 112. In this regard, the host module 120, which may be designated as Process-1, may load the bridge module 102 in memory. During the loading procedure, the bridge module 102 may create the plug-in process 116 (which may also be designated as Process-2). For example, the plug-in process 116 may include a locally running web server which will host the user interface 106 for the digital signal processing plugin, as-well as the digital signal processing logic 112.

The host module 120 may further establish the two-way communication link 118 with the plug-in process 116 (and thus with the digital signal processing logic module 114 and the control module 108) via IPC APIs. For example, the two-way communication link 118 may be generated by creating a memory-mapped file, over which the two processes (e.g., Process-1 and Process-2 (the plug-in process 116)) may communicate by means of a lock-free producer-consumer queue(s). An example of IPC APIs may include CreateFileMapping (INVALID_HANDLE_VALUE, NULL, PAGE_READWRITE, 0, QUEUE_SIZE_BYTES, NAME), MapViewOfFile (hFileMapping, FILE_MAP_AL- L_ACCESS, 0, 0, QUEUE_SIZE_BYTES). In this regard, the IPC APIs may establish the two-way communication link 118 for the aforementioned processes. The lock-free producer-consumer queue may reside on top of the memory-mapped file, and serve as the protocol for passing data back and forth between the different processes (and thus between the host module 120, the digital signal processing logic module 114, and the control module 108).

MIDI data originating from the host module 120 (e.g., Process-1) may be sent to the bridge module 102, which may further forward the MIDI data to Process-2 (the plug-in process 116) via the established two-way communication link 118 and the MIDI data may be read and processed by Process-2 (the plug-in process 116).

Audio data originating from the Process-2 (the plug-in process 116) may be sent back to the bridge module 102 via the established two-way communication link 118, and finally back to the host module 120.

A user may graphically control and observe the behavior of the apparatus 100, for example, by using a web-browser. In this regard, the web browser may communicate over HyperText Transfer Protocol (HTTP) with Process-2 (the plug-in process 116). The web browser may serve as a presentation layer, for example, to display the user interface 106 for a user. According to an example, the control module 108 may serve the associated web-page for the user via HTTP.

An example of a flow related to operation of the host module 120 may include loading of a plugin routine to implement the digital signal processing plug-in by loading of the bridge module 102. Loading of the bridge module 102 may initiate a host specific initialization routine to create the plug-in process 116. As disclosed herein, the two-way communication link 118 may be established by creation of a named memory mapped file, and initialization of a lock-free producer-consumer queue. With respect to handling of MIDI messages from the bridge module, MIDI messages may be sent to the lock-free producer-consumer queue. The MIDI messages may flow in both directions (e.g., to/from) the host module 120, the digital signal processing logic module 114, and the control module 108, with the lock-free producer-consumer queue being the medium which delivers these messages in either direction. An example may include the host module 120 sending a MIDI message to the bridge module 102 (and the digital signal processing logic module 114), the payload being a MIDI instruction to "play a specific note".

With respect to handling of audio data, audio data may be read from the lock-free producer-consumer queue. The audio data may be sent to and from the digital signal processing logic module 114. For example, audio data originating from the digital signal processing logic module 114 (e.g., synthesized audio) may be sent back to the host module 120 via the bridge module 102 for further processing by the host module 120. Audio data originating from the host module 120 may be sent to the digital signal processing logic module 114 for further processing (e.g., taking a pre-existing audio stream, and making it louder).

An example of a flow related to a secondary process may include loading of a plugin routine to implement the digital signal processing plug-in by establishing the two-way communication link 118 with the bridge module 102. Thereafter, a named memory mapped file may be created, and attached to the shared lock-free producer-consumer queue.

As disclosed herein, the named memory-mapped file may represent an IPC mechanism that allows processes that may be executed in isolation, to communicate and exchange data with each other. In the case of memory-mapped files, an operating system may offer two (or more) processes to share memory in between each other.

As disclosed herein, the lock free producer-consumer queue may represent the data structure/algorithm that is used on-top of the memory-mapped file to facilitate the communication. The lock free producer-consumer queue may establish a protocol for the different processes involved to communicate with one another efficiently. The lock free producer-consumer queue may support "ReadMessage" and "WriteMessage" APIs which may be utilized by the host module 120, the bridge module 102, the digital signal processing logic module 114, and the control module 108.

The host module 120 may send a MIDI message to the bridge module 102. The bridge module 102 may send the MIDI message using, for example, the "WriteMessage" API. The digital signal processing logic module 114 and the control module 108 may then pick up the MIDI message using, for example, the "ReadMessage" API and react on the message. Audio data may be handled in a similar manner.

With respect to handling of MIDI messages (e.g., host-specific), the user interface 106 may be updated as needed. In this regard, the host module 120 may instruct the bridge module 102 to "play a certain note" by passing a corresponding MIDI message. The bridge module 102 may then relay this message to both the digital signal processing logic module 114 and the control module 108. The control module 108 may then decide to, for example, display some type of user interface animation that corresponds with "playing a certain note".

Based on the update to the user interface 106, digital signal processing logic 112 may be applied as needed. With respect to audio handling, audio data may be generated based on a plug-in specific logic. In a similar manner as the MIDI data, depending on the product that is being developed, the digital signal processing logic module 114 may differ for each product. For example, a type of the digital signal processing logic module 114 may generate certain types of sounds (e.g., some type of synthesizer). When the sound is "generated", the sound may be sent back to the host module 120. The host module 120 may then route the sound, for example, to the computer's audio interface so that it can be played over the speakers. This audio may be first generated by the digital signal processing logic module 114, and may then travel all the way back to the bridge module 102 and the host module 120. In this regard, the lock-free producer-consumer queue may represent the "message bus" that lets the digital signal processing logic module 114 send the data efficiently back to the bridge module 102.

Figure 2:
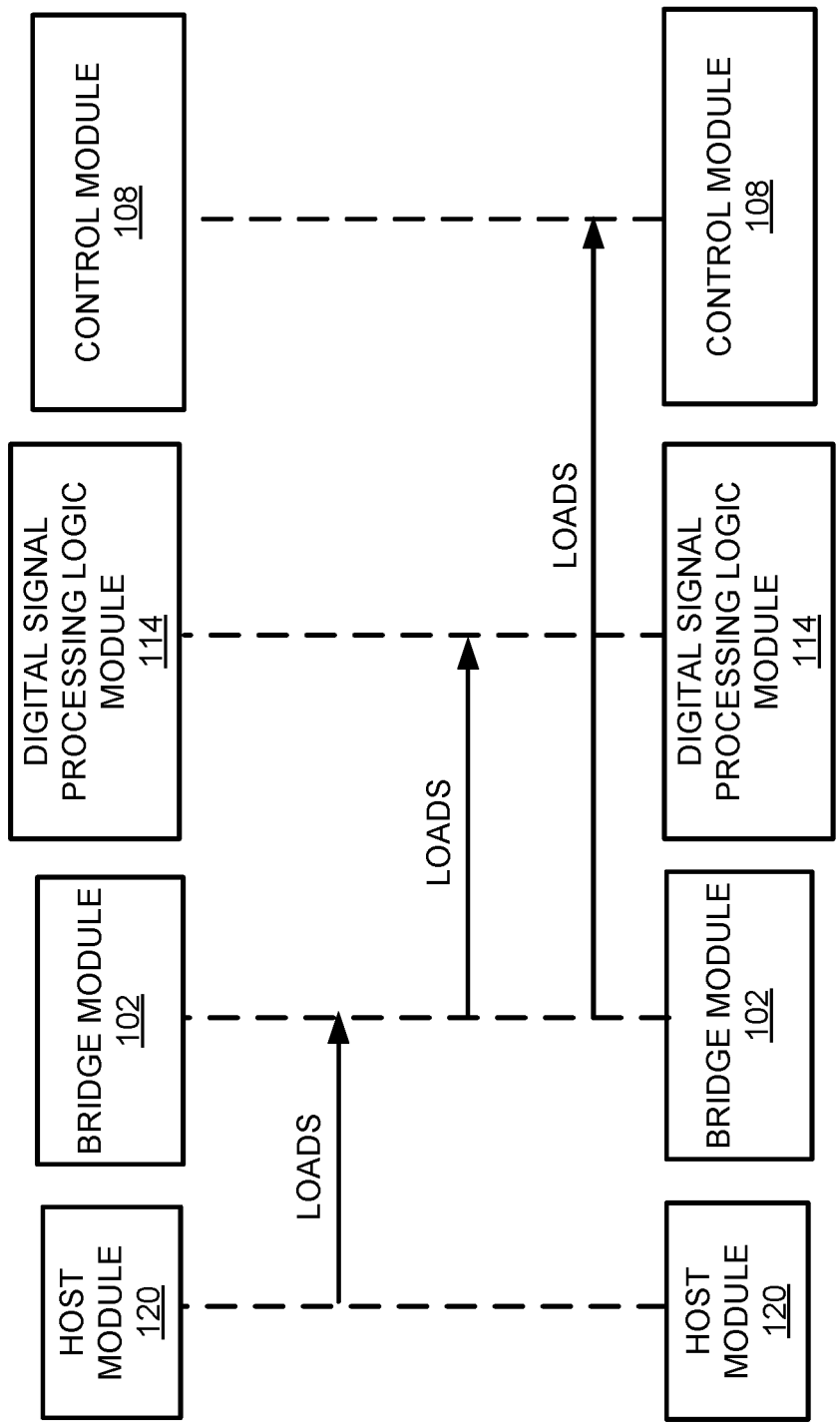
FIG. 2 illustrates loading of a bridge module by a host module, and loading of a digital signal processing logic module and a control module by the bridge module to illustrate operation of the digital signal processing plug-in implementation apparatus of FIG. 1 in accordance with an embodiment of the present disclosure.

FIG. 2 illustrates loading of the bridge module 102 by the host module 120, and loading of the digital signal processing logic module 114 and the control module 108 by the bridge module 102 to illustrate operation of the apparatus 100 in accordance with an embodiment of the present disclosure.

Referring to FIG. 2, as disclosed above, the host module 120 may be tasked with loading of the bridge module 102. For example, as disclosed above, operation of the host module 120 may include loading of a plugin routine to implement the digital signal processing plug-in by loading of the bridge module 102. Further, as disclosed above, an example of a flow related to a secondary process may include loading of a plugin routine to implement the digital signal processing plug-in by establishing the two-way communication link 118 with the bridge module 102. In this regard, once the two-way communication link 118 is established, the bridge module 102 may load the digital signal processing logic module 114 and the control module 108.

As disclosed herein, the host module 120 may start by loading the bridge module 102.

The host module 120 may initialize the bridge module 102. The exact initialization protocol may be both host and platform specific (e.g., the bridge module 102 may be developed to abstract these aspects away from the actual digital signal processing logic module 114 and the control module 108). As part of the initialization procedure, the host module 120 may provide the bridge module 102 with a runtime "configuration". The configuration data may include, for example, a "Plugin Name" string.

When the bridge module 102 is initializing upon first being loaded by the host module 120, the bridge module 102 may need to load and initialize the digital signal processing logic module 114 and the control module 108. For example, the bridge module 102 may consult a "mapping" of the "Plugin Name" string, to locate the digital signal processing logic module 114 and the control module 108. The mapping may likely come in the form of a file, or a global registry (such as the Windows™ registry), or may be embedded within the bridge module 102.

Once the bridge module 102 has established which specific digital signal processing logic module 114 and control module 108 to load, the bridge module 102 may proceed to load the modules. This may include creating a new, separate process for the control module 108 and the digital signal processing logic module 114. For example, for a control module and digital signal processing logic module written in Python, the bridge module 102 may run the "python.exe" interpreter process, which may execute the control module 108 and the digital signal processing logic module 114 codes.

The two-way communication link 118 may be a communication link between the bridge module 102, the digital signal processing logic module 114, and the control module 108.

Figure 3:
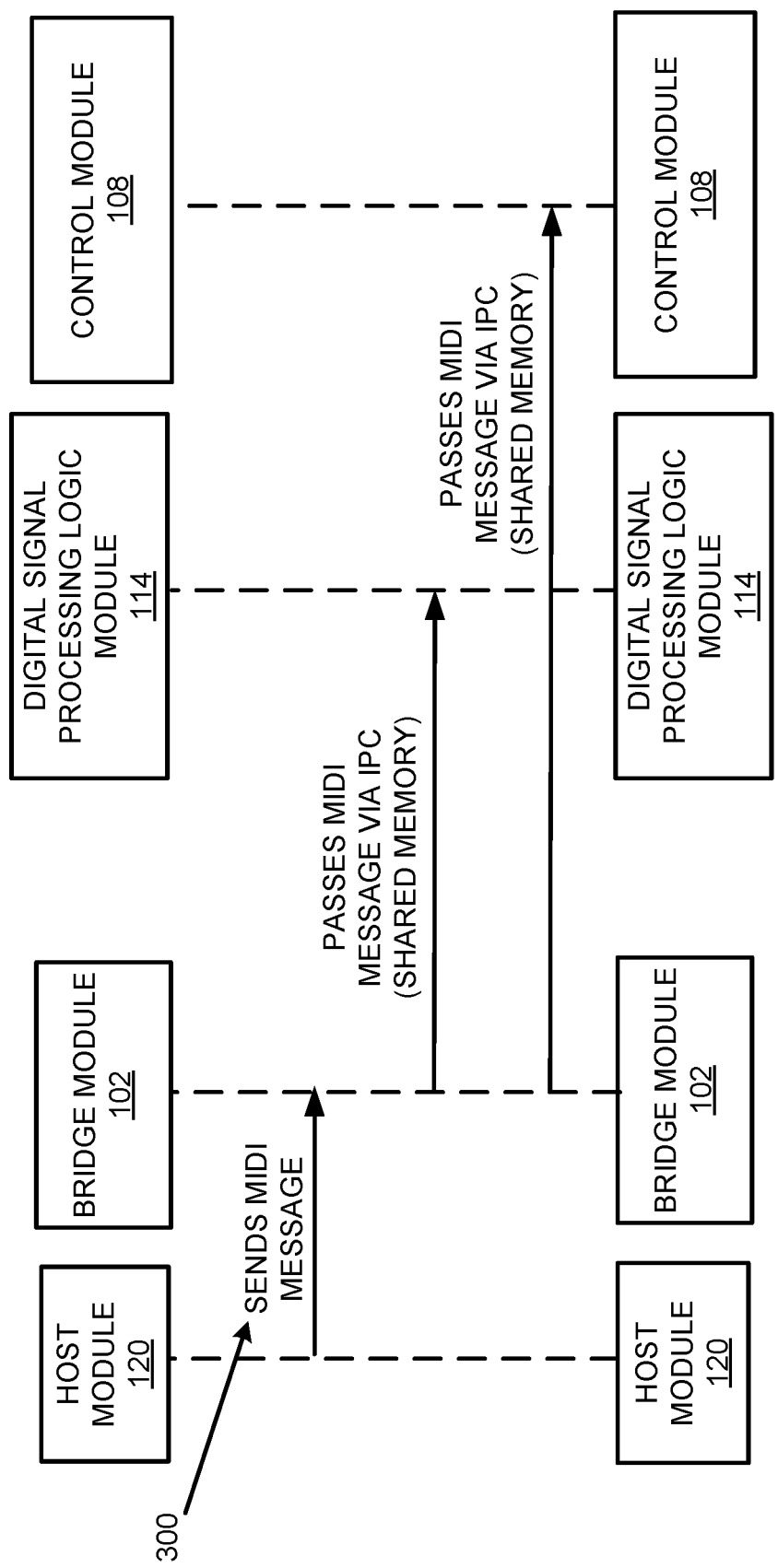
FIG. 3 illustrates forwarding of musical instrument digital interface (MIDI) data from the host module to the bridge module, the digital signal processing logic module, and the control module of the digital signal processing plug-in implementation apparatus of FIG. 1 in accordance with an embodiment of the present disclosure.

FIG. 3 illustrates forwarding of MIDI data from the host module 120 to the bridge module 102, the digital signal processing logic 112, and the control module 108 of the apparatus 100 in accordance with an embodiment of the present disclosure.

Referring to FIG. 3, with respect to MIDI messages 300 that are to be transferred from the host module 120 to the digital signal processing logic module 114 and the control module 108, such MIDI messages may be received by the bridge module 102 and transferred from the bridge module 102 to the digital signal processing logic module 114 and the control module 108. In this regard, if a MIDI message is received from the host module, the MIDI message may be sent to the digital signal processing logic module 114 and the control module 108 via the shared lock-free producer-consumer queue, and vice-versa. The shared lock-free producer-consumer queue may operate as a message bus to provide read message and write message capabilities. An example of a MIDI message may include a user playing a key on a keyboard. In this regard, the MIDI message may be sent from the host module 120 to the bridge module 102. The bridge module 102 may pass the MIDI message to the digital signal processing logic module 114 to play a sound associated with the MIDI message, and to the control module 108 to display musical notes associated with the MIDI message.

Figure 4:
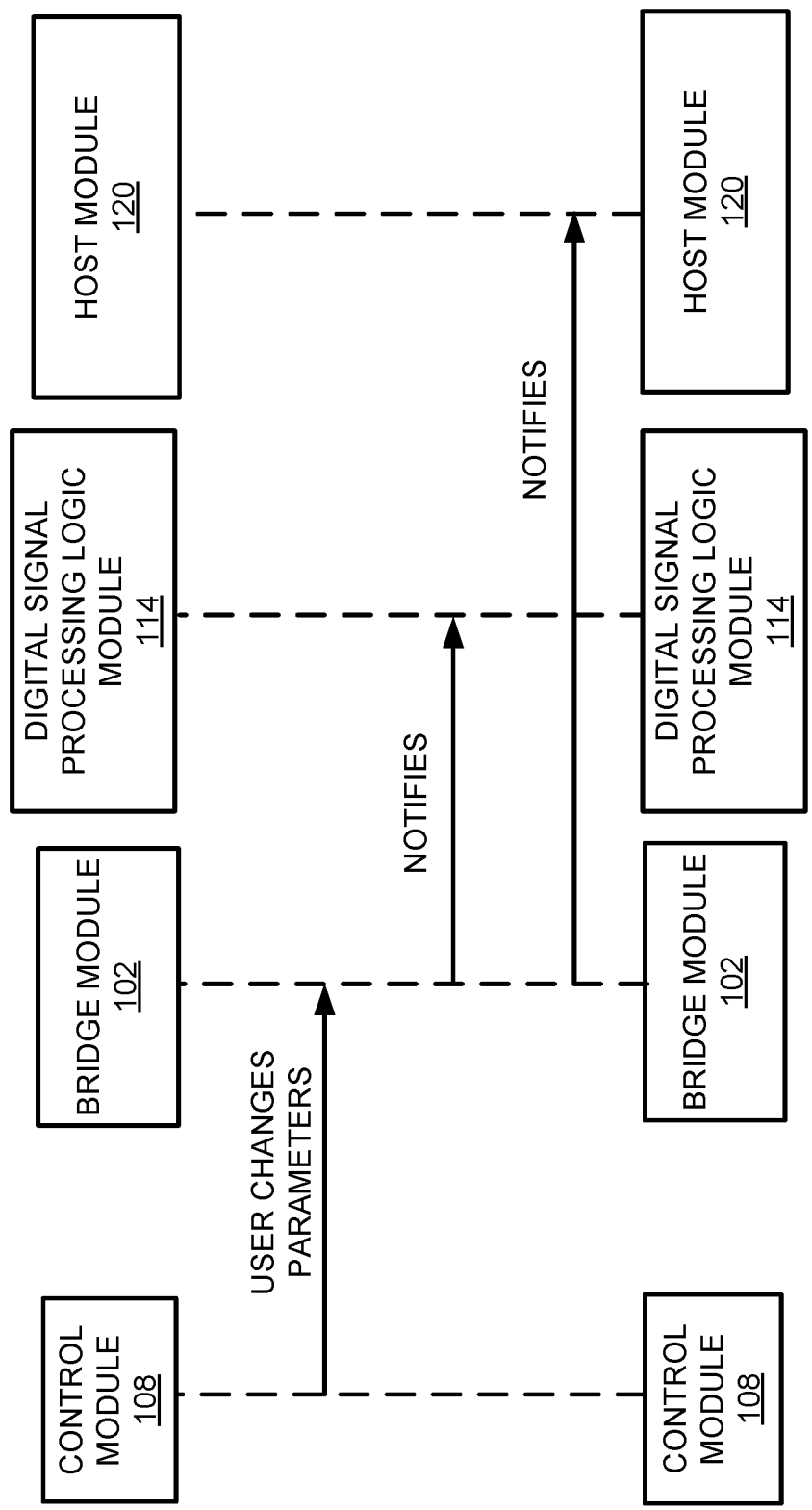
FIG. 4 illustrates forwarding of parameter changes from the control module to the bridge module, the digital signal processing logic module, and the host module of the digital signal processing plug-in implementation apparatus of FIG. 1 in accordance with an embodiment of the present disclosure.

FIG. 4 illustrates forwarding of parameter changes from the control module 108 to the bridge module 102, the digital signal processing logic module 114, and the host module 120 of the apparatus 100 in accordance with an embodiment of the present disclosure.

Referring to FIG. 4, with respect to parameters that are changed at the control module 108, such parameter changes may be transferred to the bridge module 102, which may further notify the digital signal processing logic module 114 and the host module 120 of the parameter changes. An example of a parameter change includes "a user toggles a graphical fader, which corresponds with the output level parameter in the digital signal processing logic module 114." The notification from the bridge module 102 to the digital signal processing logic module 114 may include an indication of what needs to be done differently based on the parameter changes. Further, the notification from the bridge module 102 to the host module 120 may include an indication of a parameter change request.

Figure 5:
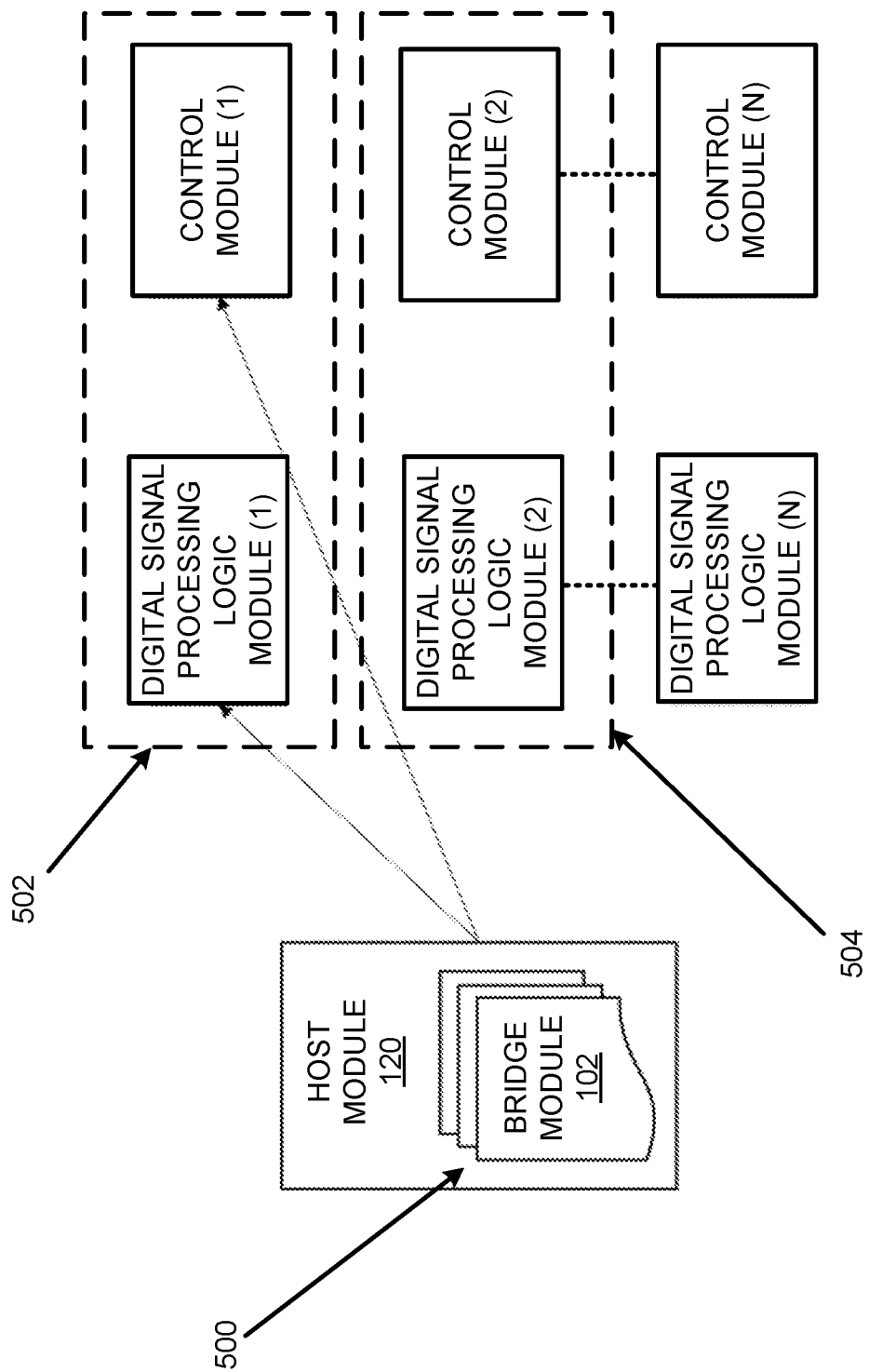
FIG. 5 illustrates matching of a digital signal processing logic module and a control module to an appropriate bridge module of a plurality of bridge modules to illustrate operation of the digital signal processing plug-in implementation apparatus of FIG. 1 in accordance with an embodiment of the present disclosure.

FIG. 5 illustrates matching of a digital signal processing logic module and a control module to an appropriate bridge module of a plurality of bridge modules to illustrate operation of the apparatus 100 in accordance with an embodiment of the present disclosure.

Referring to FIG. 5, the host module 120 may operate a plurality of bridge modules 500. Each of the bridge modules 500 may correspond to a particular digital signal processing logic module and a control module. For example, a first bridge module (e.g., bridge module-1) may correspond to a particular digital signal processing logic module-1 and a control module-1 for an IOS™ system at 502, a second bridge module (e.g., bridge module-2) may correspond to another particular digital signal processing logic module-2 and control module-2 for an Android™ system at 504, etc. The host module 120 may pass a set of arguments to the bridge module (e.g., the "original plug-in name"). The bridge module may then, based on these arguments, look up the corresponding control module and digital signal processing logic module. A mapping may be retained, for example, in a file or in a registry, which the bridge module may consult to determine which control module and digital signal processing logic module to load.

Figure 6:
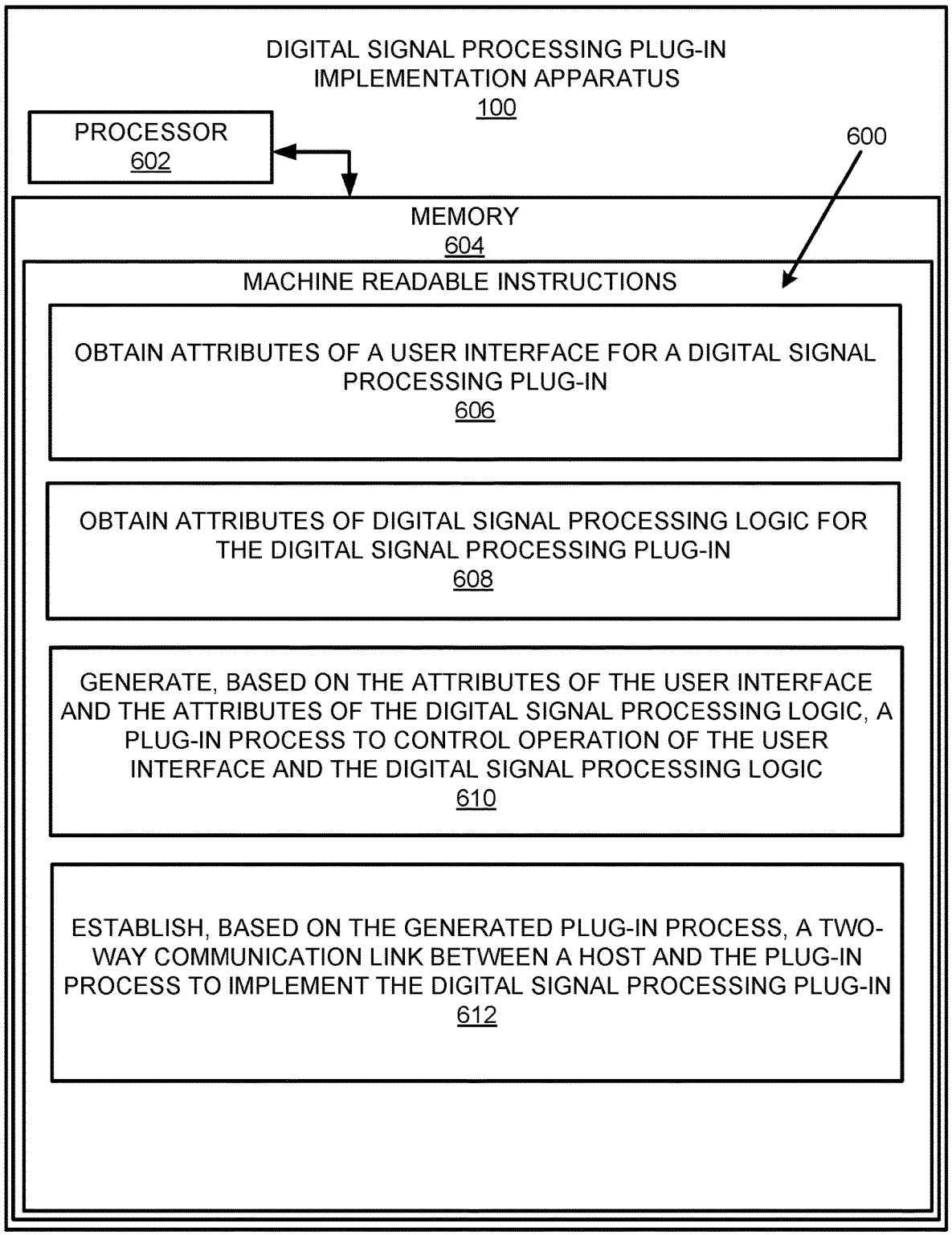
FIG. 6 illustrates an example block diagram for digital signal processing plug-in implementation in accordance with an embodiment of the present disclosure.
Figure 7:
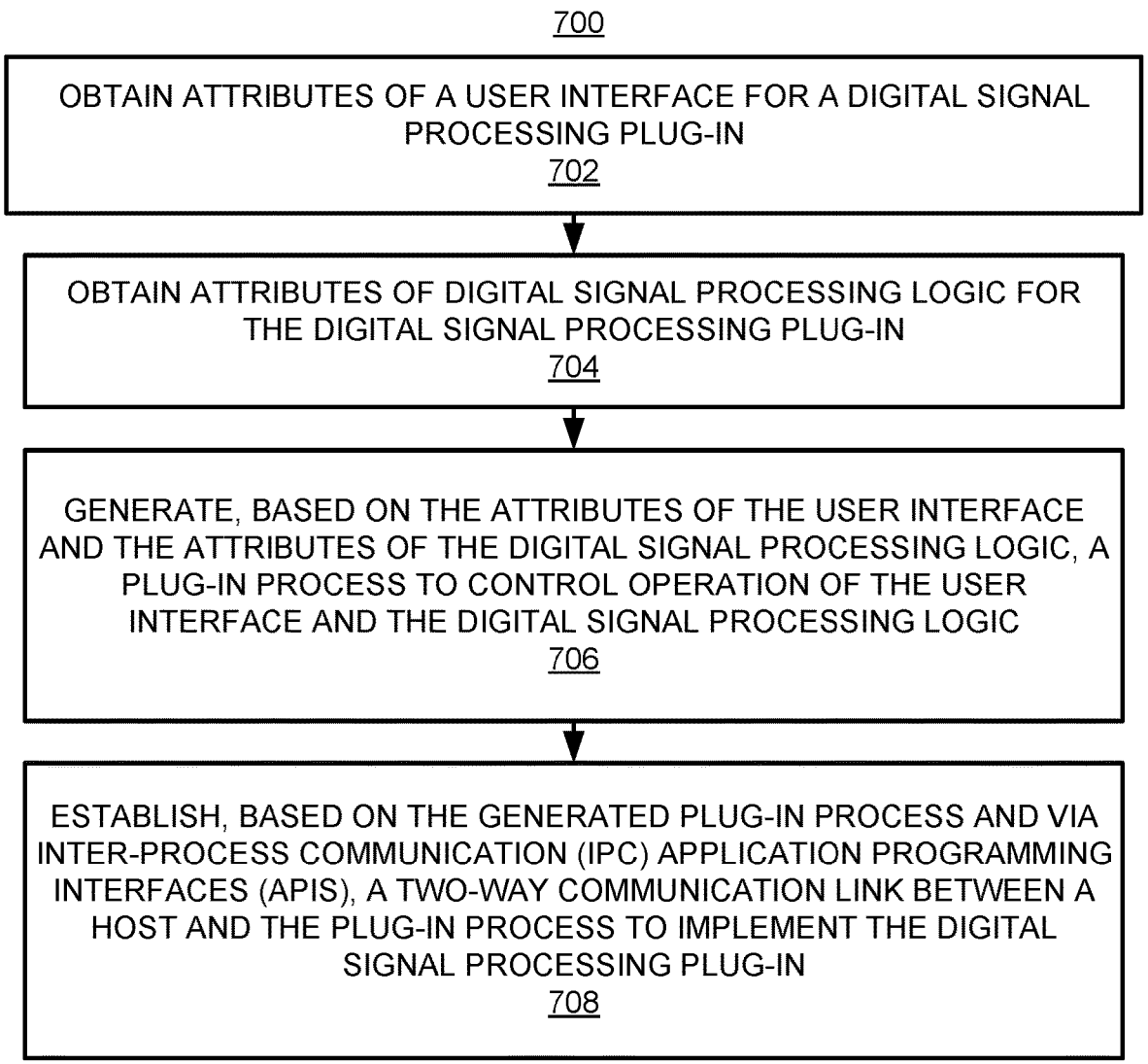
FIG. 7 illustrates a flowchart of an example method for digital signal processing plug-in implementation in accordance with an embodiment of the present disclosure.
Figure 8:
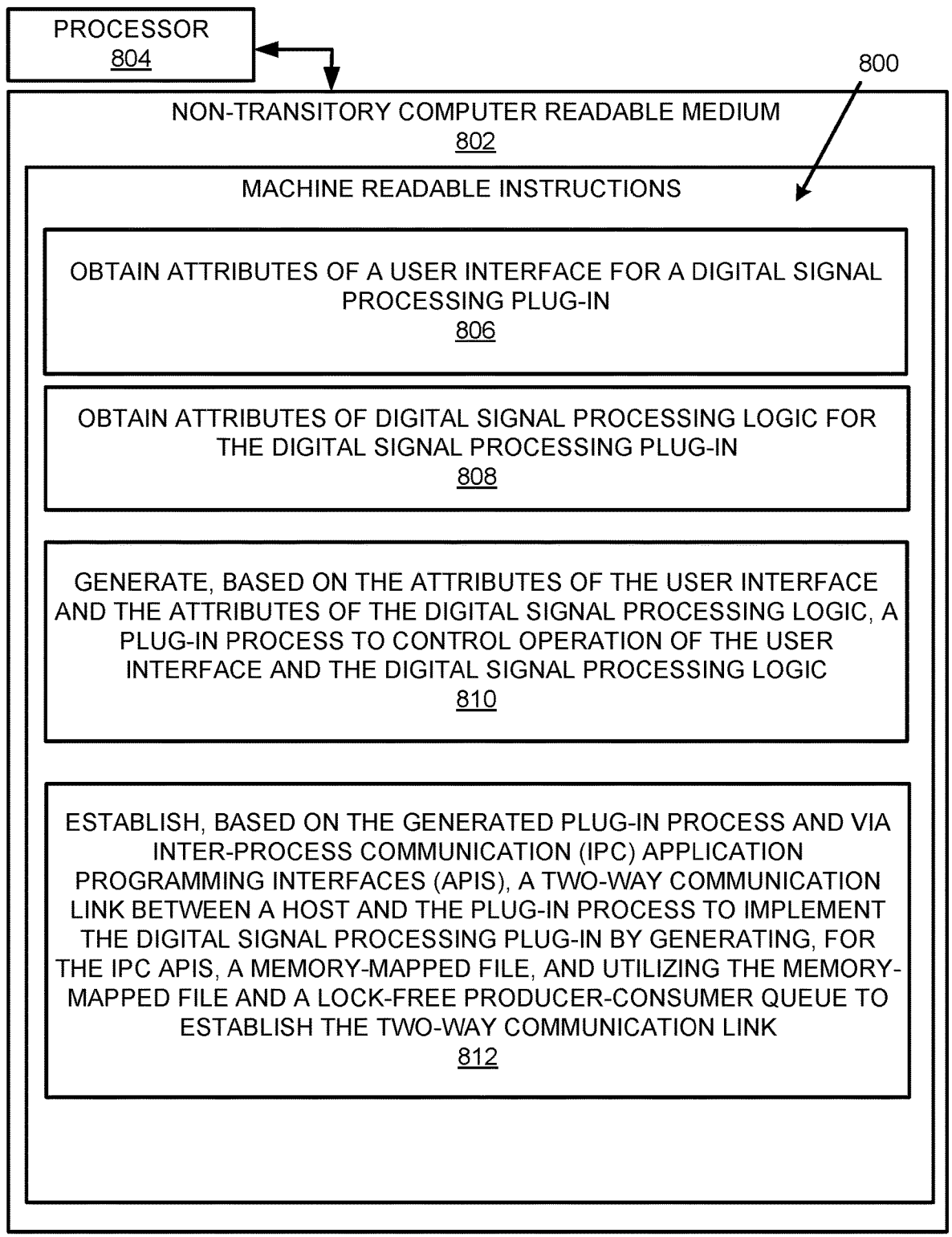
FIG. 8 illustrates a further example block diagram for digital signal processing plug-in implementation in accordance with another embodiment of the present disclosure.

FIGS. 6-8 respectively illustrate an example block diagram 600, a flowchart of an example method 700, and a further example block diagram 800 for digital signal processing plug-in implementation, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for digital signal processing plug-in implementation, and the steps of the method. FIG. 8 may represent a non-transitory computer readable medium 802 having stored thereon machine readable instructions to provide digital signal processing plug-in implementation according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to obtain attributes 104 of a user interface 106 for a digital signal processing plug-in.

The processor 602 may fetch, decode, and execute the instructions 608 to obtain attributes 110 of digital signal processing logic 112 for the digital signal processing plug-in.

The processor 602 may fetch, decode, and execute the instructions 610 to generate, based on the attributes 104 of the user interface 106 and the attributes 110 of the digital signal processing logic 112, a plug-in process 116 to control operation of the user interface 106 and the digital signal processing logic 112.

The processor 602 may fetch, decode, and execute the instructions 612 to establish, based on the generated plug-in process 116, a two-way communication link 118 between a host module 120 and the plug-in process 116 to implement the digital signal processing plug-in.

Referring to FIGS. 1-5 and 7, and particularly FIG. 7, for the method 700, at block 702, the method may include obtaining attributes 104 of a user interface 106 for a digital signal processing plug-in.

At block 704, the method may include obtaining attributes 110 of digital signal processing logic 112 for the digital signal processing plug-in.

At block 707, the method may include generating, based on the attributes 104 of the user interface 106 and the attributes 110 of the digital signal processing logic 112, a plug-in process 116 to control operation of the user interface 106 and the digital signal processing logic 112.

At block 708, the method may include establishing, based on the generated plug-in process 116 and via IPC APIs, a two-way communication link 118 between a host module 120 and the plug-in process 116 to implement the digital signal processing plug-in.

Referring to FIGS. 1-5 and 8, and particularly FIG. 8, for the block diagram 800, the non-transitory computer readable medium 802 may include instructions 806 to obtain attributes 104 of a user interface 106 for a digital signal processing plug-in.

The processor 804 may fetch, decode, and execute the instructions 808 to obtain attributes 110 of digital signal processing logic 112 for the digital signal processing plug-in.

The processor 804 may fetch, decode, and execute the instructions 810 to generate, based on the attributes 104 of the user interface 106 and the attributes 110 of the digital signal processing logic 112, a plug-in process 116 to control operation of the user interface 106 and the digital signal processing logic 112.

The processor 804 may fetch, decode, and execute the instructions 812 to establish, based on the generated plug-in process 116 and via IPC APIs, a two-way communication link 118 between a host module 120 and the plug-in process 116 to implement the digital signal processing plug-in by generating, for the IPC APIs, a memory-mapped file, and utilizing the memory-mapped file and a lock-free producer-consumer queue to establish the two-way communication link.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
a processor; and
a memory storing machine readable instructions that when executed by the processor cause the processor to:
obtain attributes of a user interface for a digital signal processing plug-in;
obtain attributes of digital signal processing logic for the digital signal processing plug-in;
generate, based on the attributes of the user interface and the attributes of the digital signal processing logic, a plug-in process to control operation of the user interface and the digital signal processing logic; and
establish, based on the generated plug-in process, a two-way communication link between a host and the plug-in process to implement the digital signal processing plug-in by
generating a memory-mapped file, and
utilizing the memory-mapped file and a lock-free producer-consumer queue to establish the two-way communication link.

2. The apparatus according to claim 1, wherein the instructions to establish, based on the generated plug-in process, the two-way communication link between the host and the plug-in process to implement the digital signal processing plug-in are further to cause the processor to:
establish, based on the generated plug-in process and via inter-process communication (IPC) application programming interfaces (APIs), the two-way communication link between the host and the plug-in process to implement the digital signal processing plug-in.

3. The apparatus according to claim 2, wherein the instructions to establish, based on the generated plug-in process and via the IPC APIs, the two-way communication link between the host and the plug-in process to implement the digital signal processing plug-in are further to cause the processor to:
generate, for the IPC APIs, the memory-mapped file; and
utilize the memory-mapped file and the lock-free producer-consumer queue to establish the two-way communication link.

4. The apparatus according to claim 3, wherein the instructions are further to cause the processor to:
forward musical instrument digital interface (MIDI) data to the lock-free producer-consumer queue.

5. The apparatus according to claim 3, wherein the instructions are further to cause the processor to:
receive audio data from the lock-free producer-consumer queue.

6. The apparatus according to claim 1, wherein the instructions are further to cause the processor to:
obtain, from the host, musical instrument digital interface (MIDI) data to be processed by the plug-in process; and forward, via the two-way communication link, the MIDI data to the plug-in process.

7. The apparatus according to claim 1, wherein the instructions are further to cause the processor to:
obtain, from the plug-in process, audio data; and
forward, via the two-way communication link, the audio data to the host.

8. The apparatus according to claim 1, wherein the instructions are further to cause the processor to:
receive configuration metadata from the host; and
identify, based on the configuration metadata, the user interface of a plurality of user interfaces and the digital signal processing logic of a plurality of digital signal processing logics for implementing communication with the host.

9. A computer-implemented method comprising:
obtaining attributes of a user interface for a digital signal processing plug-in;
obtaining attributes of digital signal processing logic for the digital signal processing plug-in;
generating, based on the attributes of the user interface and the attributes of the digital signal processing logic, a plug-in process to control operation of the user interface and the digital signal processing logic; and
establishing, based on the generated plug-in process and via inter-process communication (IPC) application programming interfaces (APIs), a two-way communication link between a host and the plug-in process to implement the digital signal processing plug-in by:
generating, for the IPC APIs, a memory-mapped file; and
utilizing the memory-mapped file and a lock-free producer-consumer queue to establish the two-way communication link.

10. The computer-implemented method according to claim 9, further comprising:
forwarding musical instrument digital interface (MIDI) data to the lock-free producer-consumer queue.

11. The computer-implemented method according to claim 9, further comprising:
receiving audio data from the lock-free producer-consumer queue.

12. The computer-implemented method according to claim 9, further comprising:
obtaining, from the host, musical instrument digital interface (MIDI) data to be processed by the plug-in process; and
forwarding, via the two-way communication link, the MIDI data to the plug-in process.

13. The computer-implemented method according to claim 9, further comprising:
obtaining, from the plug-in process, audio data; and
forwarding, via the two-way communication link, the audio data to the host.

14. The computer-implemented method according to claim 9, further comprising:
receiving configuration metadata from the host; and
identifying, based on the configuration metadata, the user interface of a plurality of user interfaces and the digital signal processing logic of a plurality of digital signal processing logics for implementing communication with the host.

15. A non-transitory computer readable medium having stored thereon machine readable instructions, the machine readable instructions, when executed by a processor, cause the processor to:
obtain attributes of a user interface for a digital signal processing plug-in;
obtain attributes of digital signal processing logic for the digital signal processing plug-in;
generate, based on the attributes of the user interface and the attributes of the digital signal processing logic, a plug-in process to control operation of the user interface and the digital signal processing logic; and
establish, based on the generated plug-in process and via inter-process communication (IPC) application programming interfaces (APIs), a two-way communication link between a host and the plug-in process to implement the digital signal processing plug-in by:
generating, for the IPC APIs, a memory-mapped file; and
utilizing the memory-mapped file and a lock-free producer-consumer queue to establish the two-way communication link.

16. The non-transitory computer readable medium according to claim 15, wherein the instructions are further to cause the processor to:
forward musical instrument digital interface (MIDI) data to the lock-free producer-consumer queue.

17. The non-transitory computer readable medium according to claim 15, wherein the instructions are further to cause the processor to:
receive audio data from the lock-free producer-consumer queue.

18. The non-transitory computer readable medium according to claim 15, wherein the instructions are further to cause the processor to:
obtain, from the host, musical instrument digital interface (MIDI) data to be processed by the plug-in process; and
forward, via the two-way communication link, the MIDI data to the plug-in process.

19. The non-transitory computer readable medium according to claim 15, wherein the instructions are further to cause the processor to:
obtain, from the plug-in process, audio data; and
forward, via the two-way communication link, the audio data to the host.

* * * * *